United States Patent Office 3,843,327
Patented Oct. 22, 1974

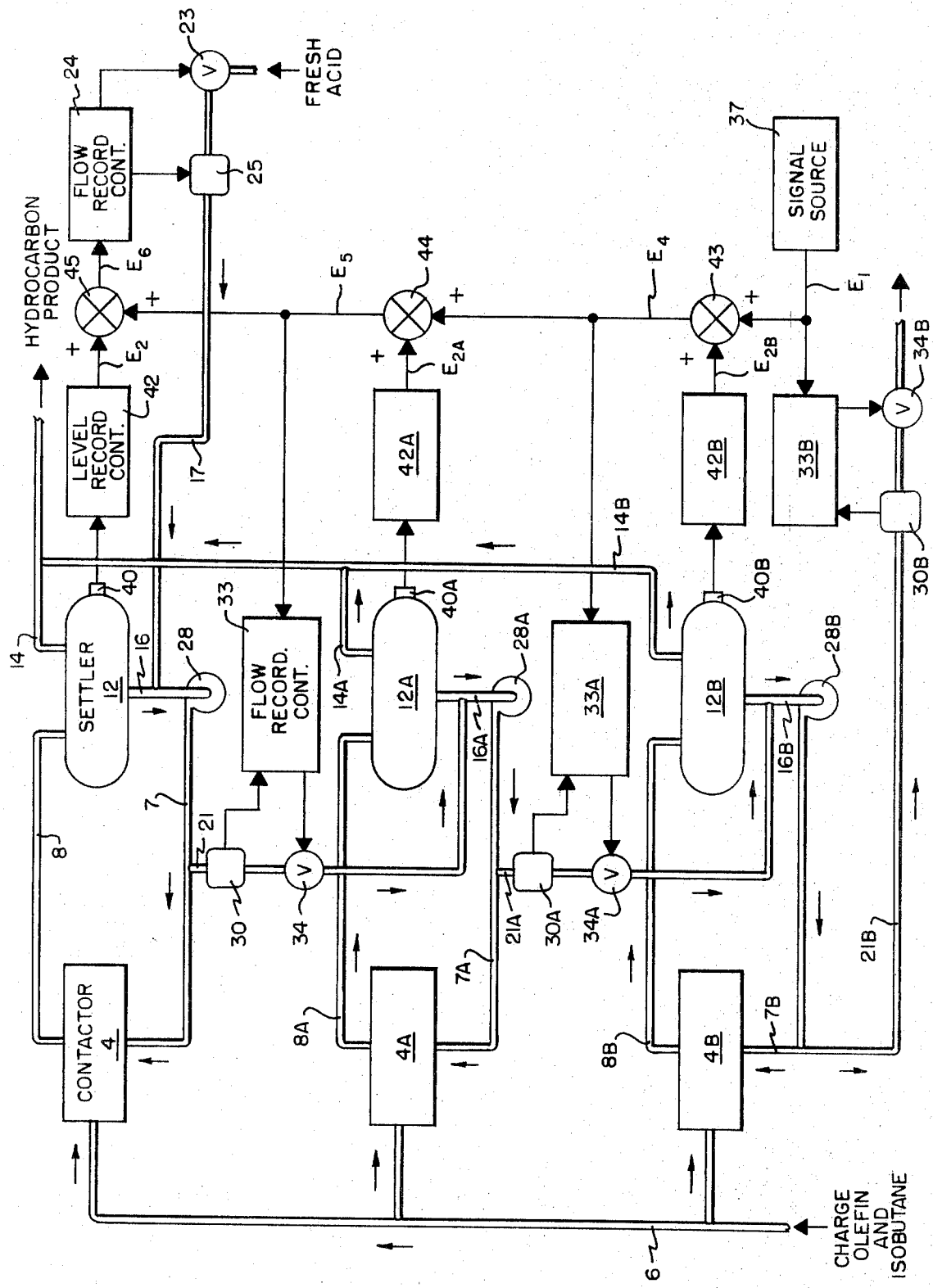

---

3,843,327
MEANS FOR CONTROLLING A CASCADE SYSTEM
Walker L. Hopkins and Richard R. Edwards, Groves, Tex., assignors to Texaco Inc., New York, N.Y.
Original application Feb. 24, 1971, Ser. No. 118,374, now Patent No. 3,720,730, dated Mar. 13, 1973. Divided and this application June 19, 1972, Ser. No. 263,802
Int. Cl. C07c 3/12
U.S. Cl. 23—260          6 Claims

ABSTRACT OF THE DISCLOSURE

Each element, in a plurality of series connected elements in the cascade system, has a storage characteristic which is sensed and controlled in accordance with a control signal. A signal corresponding to a change in the quantity of material entering or leaving the system is operated upon in accordance with the sensed storage characteristics to provide the control signals to the elements and to provide a signal to a device controlling the quantity of material—leaving or entering the system so as to maintain the storage characteristics of the elements.

---

This is a division of application Ser. No. 118,374, filed Feb. 24, 1971, now issued as Pat. No. 3,720,730 on Mar. 13, 1973.

BACKGROUND OF THE INVENTION

Field of the Invention

The present invention relates to control systems and, more particularly, to a control system for a cascade system.

Description of the Prior Art

Heretofore, stages in a cascade system such as the acid settlers in an alkylation unit are controlled individually by a makeup method or a drawoff method, as explained hereinafter. When the flow rate of the acid being discharged by the alkylation unit or entering the alkylation unit is changed, the acid system of the alkylation processing unit becomes unbalanced and does not reach a stabilized condition until 8 to 12 hours after the change.

The apparatus of the present invention provides for a quicker response time in controlling the acid system, as well as any other cascade system, by decoupling the effects of the stages on each other, so that fresh acid entering the system is controlled in accordance with the change in the acid leaving the acid system, or vice versa; and the disturbance of the acid level in each settler.

SUMMARY OF THE INVENTION

Apparatus controls the storage characteristics in a system receiving and discharging material. The apparatus includes a pair of devices which regulate the quantity of material being received and discharged by the system. Circuits sense the storage characteristics of the elements and conditions of the material moving between the elements and provide corresponding signals. Control devices are connected between elements so as to affect the storage characteristics of the elements in accordance with command signals. A signal source provides a signal, when desired, to one of the regulating devices to change the quantity of the material being received or discharged by the system. A network provides a signal to the other regulating devices, in accordance with the signal from the signal source and the sensed characteristics signals from the sensing circuits, and command signals to the control devices in accordance with the signal from the signal source and the sensed characteristics and conditions signals from the sensing circuits so as to control the storage characteristics of the elements.

One object of the present invention is to reduce the time to achieve a stabilized condition for a cascade system after a change has been made in the quantity of material entering or leaving the cascade system.

Another object of the present invention is to maintain the storage characteristics of each element in a cascade system by controlling the storage characteristics in accordance with a change being impressed upon the system and any change in the storage characteristics of other elements.

Another object of the present invention is to provide control apparatus for decoupling the cascading effect of the acid levels in acid settlers in an alkylation processing unit, to provide a quicker response to a change in the quantity of acid entering or leaving the alkylation processing unit.

The foregoing and other object advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWING

The figure includes a simplified block diagram of a control system, constructed in accordance with the present invention, for controlling the flow rates of acid in an alkylation unit which is also partially shown in schematic form.

DESCRIPTION OF THE INVENTION

Referring to the figure, there is shown a portion of an alkylation unit in which an olefin is reacted with a paraffin in the presence of a catalyst such as sulfuric or hydrofluoric acid, to form a higher molecular weight isoparaffin. The olefin may be butylene and isobutane; propylene and isobutane; or butylene, propylene and isobutane.

The charge olefin enters a contactor 4 by way of a line 6 where the charge olefin is contacted with acid entering by way of line 7. Contactor 4 provides an acid-hydrocarbon mix by way of a line 8 to an acid settler 12. Settler 12 separates the hydrocarbon product from the acid and the hydrocarbon product is discharged through a line 14 while the acid is removed by way of a line 16. A pump 28 pumps the acid from line 16 to line 7.

A portion of the acid in line 7 is discharged by way of a line 21.

Fresh acid enters line 16 by way of a line 17 to replace the discharged acid. A valve 23 controls the flow rate of the fresh acid in line 17 in accordance with a signal from a conventional flow recorder controller 24. The signal from controller 24 corresponds to the difference between the actual flow rate, as determined from a signal from a sensor 25 sensing the flow rate of the fresh acid in line 17, and a target flow rate as determined by the position of a set point in controller 24.

The flow rate of the acid flowing in line 21 is sensed by a sensor 30 which provides a corresponding signal to a flow recorder controller 33 having a set point. The set point of controller 33 is at a position corresponding to a target flow rate for the acid in line 21. Controller 33 provides a signal, which corresponds to the difference between the actual flow rate and the target flow rate, to operate a valve 34 so as to conform the actual flow rate of the acid in line 21 to the target flow rate.

Charge olefin in line 6 is also supplied to contactors 4A, 4B. Elements having a numeric designation with a suffix are connected and operate in a similar manner as elements having the same numeric designation without the suffix. It should be noted, however, that the acid being discharged through line 21 is fresh acid for the system using the elements having the A suffix. Similarly, the acid being discharged through line 21A is fresh acid for the system using elements having the B suffix. The acid being discharged through line 21B may be disposed of as slop or provided to another alkylation processing unit.

The acid settles to the bottom in each settler while the hydrocarbon rises to the top. The level of the acid determines the quality of the hydrocarbon product and of the acid leaving that settler so that it is important to maintain the acid level in each settler at a predetermined level.

As previously mentioned, heretofore alkylation units use either a drawoff or a make up level control. In the drawoff method, the acid level in the settler is used to control the flow rate of the acid leaving the settler. For example, when the acid level in the settler drops, a signal is generated which is used to reduce the discharged acid flow rate. Since more acid is entering the settler than is leaving, the acid level rises accordingly until the acid reaches the proper level. Similarly, when the acid level is higher than its proper level, the discharge acid flow rate is increased until the proper level is attained.

In the make up control method, the acid level is used to control the acid entering the acid settler. By way of an example, when the acid level in the settler is too low, the flow rate of fresh acid is increased thereby raising the acid level. Similarly, when the acid level is too high, the flow rate of the acid entering the settler is decreased until the proper acid level is attained.

The problem with the aforementioned control systems may be seen by looking at the discharge acid flow rate in line 21B and its effect on the acid levels in settlers 12, 12A, and 12B. When the discharge acid flow rate in line 21B is increased, in the aforementioned control systems, settler 12B experiences a lower acid level since the flow rate of the acid entering the contactor-settler sub-system having the B suffix is not increased until the acid level decreases. The increase in the acid flow rate causes the acid level in settler 12A to decrease. The process is repeated until the acid level in settler 12 also decreases, finally resulting in the fresh acid flow rate being increased. However, now the acid system in the alkylation processing unit is in state of flux where it remains until all the acid levels are at their proper levels and the fresh acid flow rate substantially corresponds to the discharge acid flow rate. The elapsed time for the system to regain stability normally may be from 8 to 12 hours. The control system of the present invention effectively controls the fresh acid in line 17 in accordance with a change in the flow rate of the discharge acid in line 21B and changes in the acid levels in settlers 12, 12A and 12B so as to provide a rapid response to the change in the discharge acid flow rate.

Level sensors 40 through 40B provide signals corresponding to the levels in settlers 12, 12A and 12B, respectively, to level recorder controllers 42, 42A and 42B, respectively. Level recorder controllers 42, 42A and 42B provide signals $E_2$, $E_{2A}$, $E_{2B}$ corresponding to the differences between the actual acid levels in settlers 12, 12A and 12B, respectively, and target acid levels.

Flow recorder controller 33B receives a variable amplitude direct current signal $E_1$ from a signal source 37, which positions the set point of recorder controller 33B accordingly. A change in amplitude of signal $E_1$ causes a corresponding change in the set point position in flow recorder controller 33B. Valve 30B is operated by flow recorder controller 33B to change the acid flow rate in line 21B accordingly.

Summing means 43 sums the signal $E_{2B}$ from level recorder 42B with signal $E_1$ to provide a command signal $E_4$ to flow recorder controller 33A and to summing means 44. Signal $E_4$ positions the set point of flow recorder 33A to control the acid flow rate from settler 12A to settler 12 so as to affect the acid levels in settlers 12A, 12B. Signal $E_4$ is summed with signal $E_{2A}$ from level recorder 42A by summing means 44 to provide a command signal $E_5$ to flow recorder controller 33 and to summing means 45. Command signal $E_5$ adjusts the set point of flow recorder controller 33 to control the flow rate of the acid flowing from settler 12 to settler 12A so as to effect the acid levels in settlers 12, 12A. Summing means 45 sums command signal $E_5$ with signal $E_2$ from level recorder 42 to provide a signal $E_6$ to flow recorder controller 24 for controlling the set point so as to affect the acid level of settler 12 and the flow rate of fresh acid in line 17 entering the system.

Assuming that the acid is at the proper levels in settlers 12, 12A and 12B, signals $E_2$ through $E_{2A}$ have zero values so that signals $E_4$, $E_5$ and $E_6$ are substantially equal to signal $E_1$. The flow rates of the acid in lines 17, 21 and 21A are therefore substantially equal to the discharge acid flow rate. Ideally, the acid levels in settlers 12, 12A and 12B will not change. Since the ideal case seldom exists, level error signals $E_2$, $E_{2A}$ and $E_{2B}$, from level recorder controllers 42, 42A, and 42B, are used to compensate for any acid level change.

For the purpose of illustration, consider the situation where the acid level in settler 12B increases by a certain amount while the acid levels in settlers 12, 12A decrease by lesser amounts when the discharge acid flow rate in line 21B is changed. It is obvious that the acid flow rate between settlers 12A, 12B has increased, while the acid flow rates into settler 12 and between settlers 12, 12A have also increased but by a lesser amount. Signal $E_{2B}$ from level recorder 42B increases in a negative direction while signals $E_2$, $E_{2A}$ from level recorder 42 and 42A, respectively, increase in a positive direction. Summing means 43 provides signal $E_4$, which in this illustration corresponds to the difference between signals $E_1$ and $E_{2B}$, since $E_{2B}$ is negative, to controller 33A. Controller 33A effectively reduces the flow rate of the acid entering settler 12B from settler 12 with respect to the discharge acid flow rate causing settler 12B acid level to decrese until the acid reaches the proper level. At that time, signal $E_{2B}$ is zero and the flow rate of acid entering settler 12B from settler 12A is equal to the discharge acid flow rate.

Meanwhile, signal $E_{2A}$, since it is positive, is added to signal $E_4$ by summing means 44 to provide signal $E_5$ to controller 33. Controller 33 operates valve 34 to increase the flow rate of the acid entering settler 12A from settler 12 thereby increasing the acid level in settler 12A. When settlers 12A, 12B have proper acid levels, the flow rate of the acid entering settler 12A from settler 12B equals the discharge acid flow rate.

Initially, signal $E_6$ was equal to the sum of signals $E_1$, $E_2$ and $E_{2A}$, less signal $E_{2B}$. When settlers 12, 12A and 12B attained the proper acid levels, signals $E_2$, $E_{2A}$ and $E_{2B}$ went to zero causing signals $E_1$, $E_6$ to become equal so that the new fresh acid flow rate equals the new discharge acid flow rate.

It may be desirable to compensate for an effect referred to as "expansion." Expansion occurs when the flow rate in one line, such as line 21B, is slightly greater than the next preceding corresponding line, such as line 21B, while the acid level in a corresponding settler, such as settler 12B, remains constant. By way of example, assume that the acid flow rates in lines 17, 21, 21A and 21B are 20 bbl./hr., 20.1 bbl./hr., 20.3 bbl./hr. and 20.6 bbl./hr. for constant acid levels in settlers 12, 12A and 12B. The compensation factors are:

$$K_1 = \frac{20.0 \text{ bbl./hr.}}{20.1 \text{ bbl./hr.}} = .995$$

$$K_2 = \frac{20.1 \text{ bbl./hr.}}{20.3 \text{ bbl./hr.}} = .990$$

$$K_3 = \frac{20.3 \text{ bbl./hr.}}{20.6 \text{ bbl./hr.}} = .985$$

Signals $E_1$, $E_4$ and $E_5$ would be multiplied by direct current voltages, corresponding to $K_3$, $K_2$ and $K_1$, respectively, by conventional type multipliers, and the resulting product signals are applied to summing means 43, 44 and 45, respectively. Signals $E_4$, $E_5$ are still applied to flow recorder controllers 33A and 33, respectively.

The control system of the present invention is not restricted to acid systems in alkylation processing units. It may be used for any cascade system in which the cascaded elements have some type of storage characteristic. By way of example, the effluent water from an atomic powered electric generating station may pass through a series of cooling pools before being discharged into a river. The control of the levels in the cooling pools and the flow rate of the water from the reactors may be acomplished with a system of the type heretofore described.

The apparatus of the present invention as heretofore described reduces the time to achieve a stabilized condition for a cascade system after a change has been made in the quantity of material entering or leaving the cascade system. The storage characteristic of each element in the cascade system is maintained by controlling the storage characteristic in accordance with a change being impressed on the system and any change in the storage characteristics of the other elements. The apparatus of the present invention decouples the cascading effect of the acid level in an acid system of an alkylation procesing unit, to provide a quicked response to a change in the quantity of acid entering or leaving the acid system.

What is claimed is:

1. Apparatus for controlling the levels of a liquid in a plurality of vessels in a system receiving and discharging the liquid, said vessels being connected in series by means for conveying the liquid from vessel to vessel, comprising a pair of control devices, one control device is connected to a first vessel of the plurality of vessels and is responsive to a first control signal to control the flow rate of the liquid being received by system and entering the first vessel, the other control device is connected to a last vessel of the plurality of vessels and is responsive to a second control signal to control the liquid leaving the last vessel and being discharged from the system, means connected to each vessel for sensing the liquid level in the vessel and providing a liquid level signal corresponding thereto, means connected to the one control device to affect the flow rate of the liquid being received by the system and entering the first vessel, means connected to each conveying means for sensing the flow rates of the liquid moving between vessels and providing flow rate signals coresponding thereto, means connected to each conveying means and to the flow rate sensing means for affecting the flow rates of the liquid between vessels in accordance with command signals and the flow rate signals, and circuit means connected to the first control signal means, to the liquid level sensing means, to the other control device and to the flow rate affecting means for providing the second control signal to the other control device in accordance with the first control signal and at least one liquid level signal and for providing the command signals to the flow rate affecting means in accordance with the first control signal and at least one liquid level signal so as to control the liquid levels in the plurality of vessels.

2. Apparatus as described in Claim 1 in which the liquid is acid, the system is an acid system in an alkylation unit, and the vessels are acid settlers.

3. Apparatus as described in Claim 2 in which the circuit means includes a plurality of series connected summing networks, corresponding in number to the number of acid settlers, a first network of the plurality of networks is connected to the first control signal means, to the conveying means connecting a second acid settler to the first acid settler, to the level sensing means sensing the acid level in the first acid settler and sums the acid level signal from the first acid settler level sensing means with the first control signal from the first control means to provide a command signal to the conveying means connecting the first acid settler to the second acid settler so as to control the acid flow rate from the first to the second acid settler, a last network of the plurality of networks being connected to the level sensing means sensing the acid level in the last acid settler and to the conveying means connecting a next-to-last acid settler to the last acid settler for summing the signal from the last mentioned sensing means with a command signal from a next connected network to provide the second control signal to the other control device, and each network of the remaining networks being connected to sensing means sensing the acid level in a corresponding acid settler and to corresponding conveying means for summing at least one acid level signal with a command signal from a next network to provide another command signal to the corresponding conveying means so as to control the acid leaving the corresponding acid settler.

4. Apparatus for controlling the levels of a liquid in a plurality of vessels in a system receiving and discharging the liquid, said vessels being connected in series by means for conveying the liquid from vessel to vessel comprising a pair of control devices, one control device is connected to a last vessel of the plurality of vessels and is responsive to a first control signal to control the flow rate of the liquid leaving the last vessel and being discharged from the system, the other control device is connected to a first vessel of the plurality of vessels and is responsive to a second control signal to control the flow rate of the liquid being received by the system and entering the first vessel, means connected to each vessel for sensing the liquid level in the vessel and providing a liquid level signal corresponding thereto, means connected to the one control device for providing the first control signal to the one control device to affect the control rate of the liquid leaving the last vessel and being discharged by the system, means connected to each conveying means for sensing the flow rates of the liquid moving between vessels and providing flow rate signals corresponding thereto, means connected to each conveying means and to the flow rate sensing means for affecting the flow rates of the liquid between vessels in accordance with command signals and the flow rate signals, and circuit means connected to the first control signal means, to the liquid level sensing means, to the other control device and to the flow rate affecting means for providing the second control signal to the other control device in accordance with the first control signal and at least one liquid level signal and for providing at least one command signal to the flow rate affecting means in accordance with the first control signal and at least one liquid level signal so as to control the liquid levels in the plurality of vessels.

5. Apparatus as described in Claim 4 in which the liquid is acid, the system is an acid system in an alkylation unit, and the vessels are acid settlers.

6. Apparatus as described in Claim 5 in which the circuit means includes a plurality of series connected summing networks, corresponding in number to the number of acid settlers, a first network of the plurality being connected to the first control signal means, to conveying means connecting a next-to-last acid settler to the last acid settler, to the level sensing means sensing the acid level in the last acid settler sums the acid level signal from the last acid settler level sensing means with the first control signal from the first control signal means to provide a command signal to the conveying means so as to control the acid flow rate from the next-to-last acid settler to the last acid settler, a last network of the plurality of networks being connected to the level sensing means sensing the acid level in the first acid settler and to the conveying means connecting the next-to-last acid settler to the last acid settler for summing the signal from the last mentioned sensing means with a command signal from a next connected network to provide the second control signal to the other control device, and each network of the remaining networks being connected to sensing means sensing the acid level in a corresponding acid settler and to corresponding conveying means for summing the sensed level signal with a command signal from a next network to provide another command signal to the corresponding conveying means so as to control the acid entering the corresponding acid settler.

References Cited

UNITED STATES PATENTS

| | | | |
|---|---|---|---|
| 3,029,829 | 4/1962 | Glueck | 137—3 |
| 3,255,161 | 6/1966 | Cobb, Jr. | 23—260 X |
| 3,589,398 | 6/1971 | Nilsson | 137—571 X |
| 3,126,903 | 3/1964 | Hart et al. | 137—Dig. 1 |
| 3,707,980 | 1/1973 | Bergamini | 137—Dig. 1 |
| 3,665,050 | 5/1972 | McGovern et al. | 260—683.62 |
| 2,592,063 | 4/1952 | Parsyn, Jr. | 260—683.59 X |
| 3,223,106 | 12/1965 | Rohmann et al. | 137—86 |

OTHER REFERENCES

Cremei et al.: "Chem. Eng. Practice," Design and Construction, vol. 9, London, Butterworth, 1965, pp. 396–397.

JAMES H. TAYMAN, Jr., Primary Examiner

U.S. Cl. X.R.

23—230 A, 253 A; 137—391, 566, 572